United States Patent
Nagatsuka (10) Patent No.: US 9,446,514 B2
(45) Date of Patent: Sep. 20, 2016

(54) LOWER LIMB STRUCTURE FOR LEGGED ROBOT, AND LEGGED ROBOT

(71) Applicant: THK CO., LTD., Tokyo (JP)

(72) Inventor: Masaki Nagatsuka, Tokyo (JP)

(73) Assignee: THK CO., LTD., Shinagawa-ku (JP)

( * ) Notice: Subject to any disclaimer, the term of this patent is extended or adjusted under 35 U.S.C. 154(b) by 0 days.

(21) Appl. No.: 14/401,892

(22) PCT Filed: Apr. 11, 2013

(86) PCT No.: PCT/JP2013/060940
§ 371 (c)(1),
(2) Date: Nov. 18, 2014

(87) PCT Pub. No.: WO2013/179782
PCT Pub. Date: Dec. 5, 2013

(65) Prior Publication Data
US 2015/0122559 A1    May 7, 2015

(30) Foreign Application Priority Data

May 31, 2012    (JP) ................................. 2012-124511

(51) Int. Cl.
*B62D 57/02*    (2006.01)
*B62D 57/032*    (2006.01)
*B25J 9/10*    (2006.01)

(52) U.S. Cl.
CPC .............. *B25J 9/1065* (2013.01); *B62D 57/02* (2013.01); *B62D 57/032* (2013.01); *Y10S 901/01* (2013.01); *Y10S 901/28* (2013.01); *Y10T 74/20329* (2015.01)

(58) Field of Classification Search
CPC ... B62D 57/02; B62D 57/022; B62D 57/032
See application file for complete search history.

(56) References Cited

U.S. PATENT DOCUMENTS 6,109,378 A    8/2000    Paakkunainen
7,561,941 B2 *    7/2009    Kwon et al. .................. 700/245

(Continued)

FOREIGN PATENT DOCUMENTS

JP    10-512503 A    12/1998
JP    2002-264046 A    9/2002

(Continued)

OTHER PUBLICATIONS

International Search Report dated Jun. 18, 2013, issued in corresponding application No. PCT/JP2013/060940.

*Primary Examiner* — Joseph Rocca
*Assistant Examiner* — Marc A Scharich
(74) *Attorney, Agent, or Firm* — Westerman, Hattori, Daniels & Adrian, LLP (57) ABSTRACT

Provided is a lower limb structure for a legged robot with which a load on an actuator for driving a knee joint can be reduced. The lower limb structure for the legged robot comprises: a hip joint main body (18); a thigh portion (12a); a hip joint coupling (22) for connecting the thigh portion (12a) to the hip joint main body (18); and a knee joint main body (19) joined to the thigh portion (12a). The lower limb structure for the legged robot provides a thigh portion auxiliary link (31) having one end portion joined to the hip joint main body (18) or the hip joint coupling (22) to be rotatable about one pitch axis and the other end portion joined to the knee joint main body (19) to be rotatable about another pitch axis. A knee joint actuator (4) increases and decreases a length from the one end portion to the other end portion of the thigh portion auxiliary link (31).

4 Claims, 5 Drawing Sheets

(56) References Cited

U.S. PATENT DOCUMENTS

| | | | |
|---|---|---|---|
| 8,138,707 B2* | 3/2012 | Takenaka et al. | 318/568.12 |
| 2003/0120388 A1* | 6/2003 | Kuroki et al. | 700/245 |
| 2004/0133307 A1 | 7/2004 | Lee et al. | |
| 2007/0210739 A1* | 9/2007 | Takenaka et al. | 318/568.12 |
| 2009/0237025 A1 | 9/2009 | Takenaka et al. | |
| 2009/0294187 A1* | 12/2009 | Lee et al. | 180/8.6 |
| 2011/0297461 A1* | 12/2011 | Miyazaki | 180/8.6 |

FOREIGN PATENT DOCUMENTS

| | | |
|---|---|---|
| JP | 2004-202676 A | 7/2004 |
| JP | 2006-43871 A | 2/2006 |
| JP | 2009-101456 A | 5/2009 |

\* cited by examiner

LOWER LIMB STRUCTURE FOR LEGGED ROBOT, AND LEGGED ROBOT

TECHNICAL FIELD

The present invention relates to a lower limb structure for a legged robot which has a plurality of leg portions and walks while swinging the respective leg portions, and the legged robot.

BACKGROUND ART

A legged robot has a plurality of leg portions and walks while swinging the respective leg portions. A legged robot which walks while balancing on two legs like a human is called a biped walking robot. A legged robot which walks on four legs like an animal is called a quadrupedal walking robot. The number of legs is typically two or four, but any number of legs more than one may be provided.

Each of the leg portions is formed by connecting links corresponding to a thigh portion, a lower leg portion, and a foot portion in order from a trunk portion with a hip joint, a knee joint, and an ankle joint interposed therebetween. Each of the links corresponding to the thigh portion, the lower leg portion, and the foot portion is connected to each of the joints to be rotatable about a pitch axis extending sideways relative to the legged robot. Each of the joints includes a motor (actuator) for rotating the link (see Patent Literature 1, for example). The motors output appropriate drive forces to control rotation angles of the links and, as a result, the legged robot can swing the leg portions forward and backward relative to the trunk portion. Here, the hip joints refer to joints connecting the trunk portion and the leg portions and joints connecting a trunk portion and front legs of the quadrupedal walking robot are also included in the hip joints. The motors are devices for converting energy of electricity, gasoline, or the like into mechanical movements and are typically electric motors or engines.

CITATION LIST

Patent Literature

Patent Literature 1: JP 2002-264046 A

SUMMARY OF INVENTION

Technical Problem

However, to carry out bending and stretching movements of the knee joints, it is necessary to rotate the motors of the knee joints at twice the rotation speeds of the motors of the hip joints. In this manner, the knee joints need to move in larger ranges at higher speeds than the other joints and thus require large motors.

Therefore, it is an object of the present invention to provide a lower limb structure for a legged robot with which loads on actuators for driving knee joints can be reduced, and the legged robot.

Solution to Problem

In order to solve the above-described problem, according to the present invention, a lower limb structure for a legged robot comprises: a hip joint main body; a thigh portion; a hip joint coupling for joining the thigh portion to the hip joint main body so that the thigh portion is rotatable at least about a pitch axis; a knee joint main body joined to the thigh portion to be rotatable about the pitch axis; a thigh portion auxiliary link having one end portion joined to the hip joint main body or the hip joint coupling to be rotatable about the pitch axis and the other end portion joined to the knee joint main body to be rotatable about the pitch axis; and a knee joint actuator for increasing and decreasing a length from the one end portion to the other end portion of the thigh portion auxiliary link.

Advantageous Effects of Invention

According to the invention, when the thigh portion rotates about the pitch axis, the knee joint main body is maintained in a certain attitude relative to the hip joint main body by the action of a parallel link. By extending and contracting the thigh portion auxiliary link by means of the knee joint actuator, it is possible to change the certain attitude of the knee joint main body maintained relative to the hip joint main body. Therefore, in carrying out bending and stretching movements of the knee joint, it is possible to halve a rotation speed of the knee joint main body about the pitch axis relative to the thigh portion compared to the prior-art legged robot including the motor provided to the knee joint. Therefore, it is possible to reduce a load on the knee joint actuator.

DESCRIPTION OF EMBODIMENTS

Figures 1A, 1B:
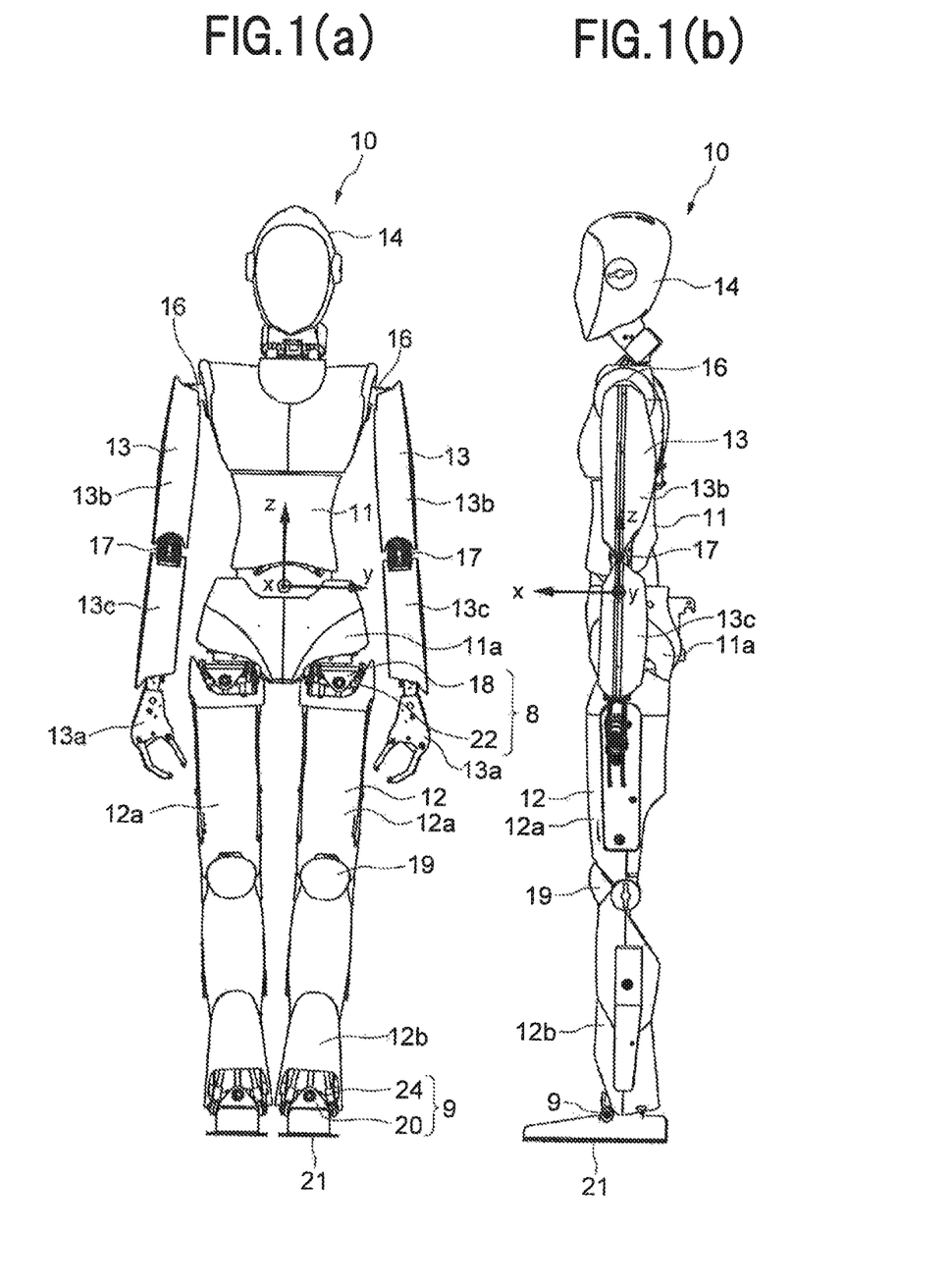
FIGS. 1(a) and 1(b) illustrate an overall structure of a legged robot according to an embodiment of the present invention (FIG. 1(a) illustrates a front view and FIG. 1(b) illustrates a left side view).

Based on the accompanying drawings, a legged robot according to an embodiment of the present invention will be described below. FIG. 1(a) is a front view and FIG. 1(b) is a left side view illustrating an overall structure of the legged robot according to the embodiment. In the following description, a traveling direction of the legged robot is defined as an x-axis direction, a left-right direction seen from the legged robot is defined as a y-axis direction, a vertical direction of the legged robot is defined as a z-axis direction, x-axis is defined as a roll axis, y-axis is defined as a pitch axis, and z-axis is defined as a yaw axis. Left and right in the following description are the left and right when seen from the legged robot shown in FIGS. 1(a) to 3(b) and front and rear are the front and rear when seen from the legged robot.

A legged robot 10 is formed by two leg portions 12 disposed below a trunk portion 11, two arm portions 13 disposed on upper left and right side faces of the trunk portion 11, and a head portion 14 disposed above the trunk portion 11 and can perform a humanlike action.

The two arm portions 13 are joined to the trunk portion 11 with shoulder joints 16 interposed therebetween and are rotatable relative to the trunk portion 11 about the yaw axis and the roll axis. Each of the arm portions 13 has an upper arm portion 13b close to a shoulder and a lower arm portion 13c close to a hand portion 13a on opposite sides of an elbow joint 17. The lower arm portion 13c is rotatable relative to the upper arm portion 13b about the yaw axis and the pitch axis.

The leg portions 12 are joined to a pelvis 11a of the trunk portion 11 with hip joints 8 interposed therebetween to be able to swing about the roll axis and the pitch axis. The legged robot 10 alternately swings the two leg portions 12 about the pitch axis and the roll axis and walks while balancing on two legs like a human.

Each of the leg portions 12 has the hip joint 8 connected to the trunk portion 11, a thigh portion 12a, a knee joint main body 19, a lower leg portion 12b, an ankle joint 9, and a foot portion 21 in order from the top. Each of the hip joints 8 includes a hip joint main body 18 connected to the trunk portion 11 and a hip joint coupling 22 for joining the hip joint main body 18 to the thigh portion 12a so that they are rotatable about the pitch axis and the roll axis. Each of the ankle joints 9 has an ankle joint main body 20 connected to the foot portion 21 and an ankle joint coupling 24 for joining the ankle joint main body 20 to the lower leg portion 12b so that they are rotatable about the roll axis and the pitch axis. The foot portion 21 lands on a walking road surface.

The legged robot 10 is a robot which can be operated remotely and, when an operator operates an operation manipulator (not shown) at a remote position, the legged robot 10 can perform an action according to the movement of the operation manipulator.

Figure 2:
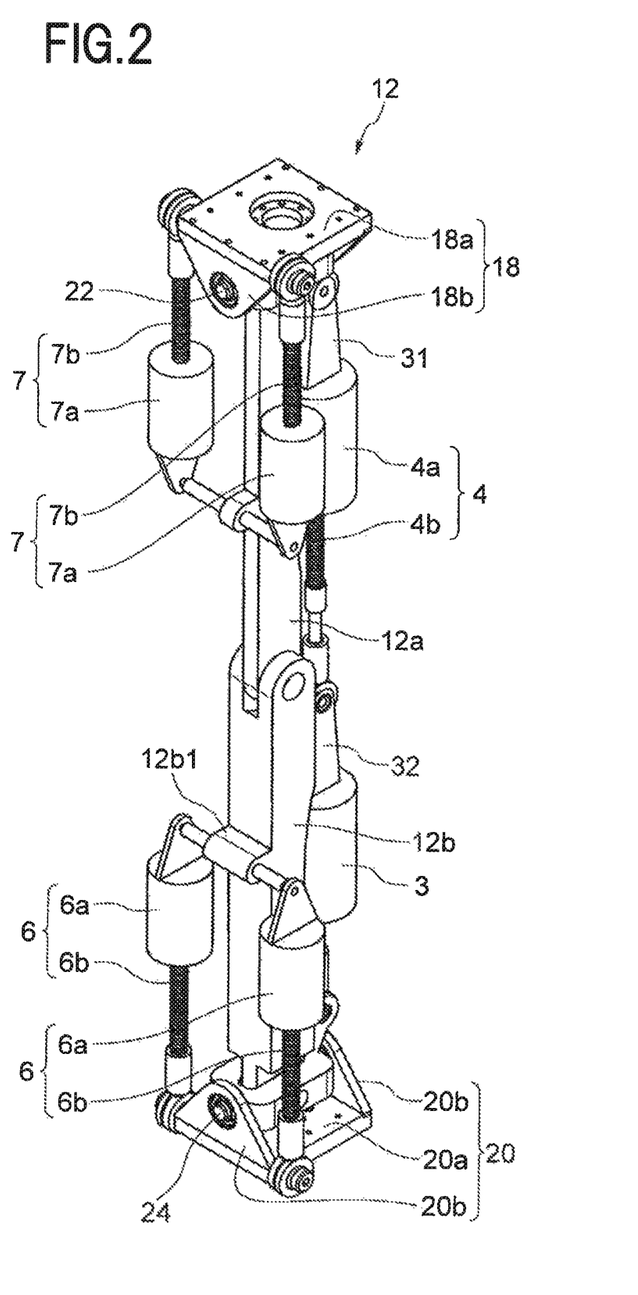
FIG. 2 illustrates a perspective view of a lower limb structure of the legged robot according to the embodiment.
Figure 3A:
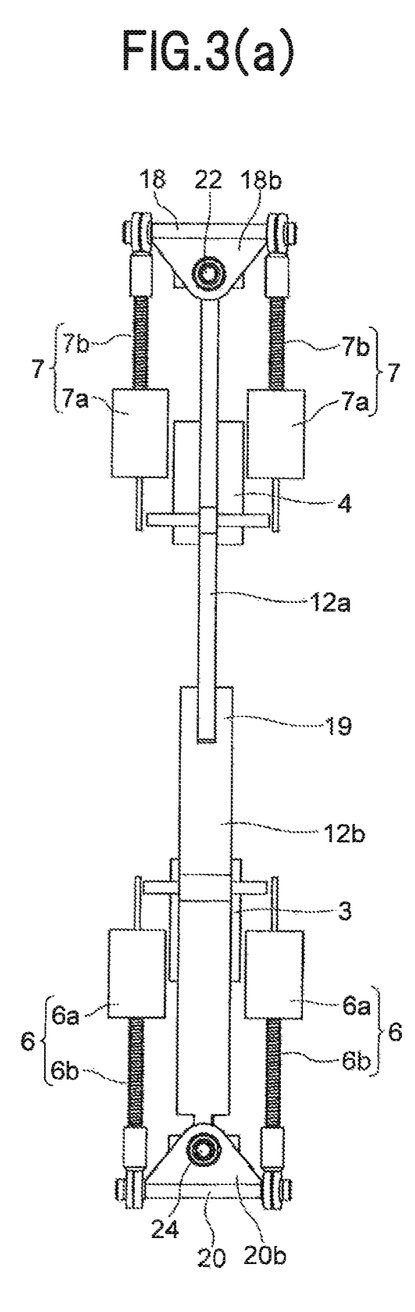
FIGS. 3(a) and 3(b) illustrate the lower limb structure of the legged robot according to the embodiment (FIG. 3(a) illustrates a front view and FIG. 3(b) illustrates a left side view).
Figure 3B:
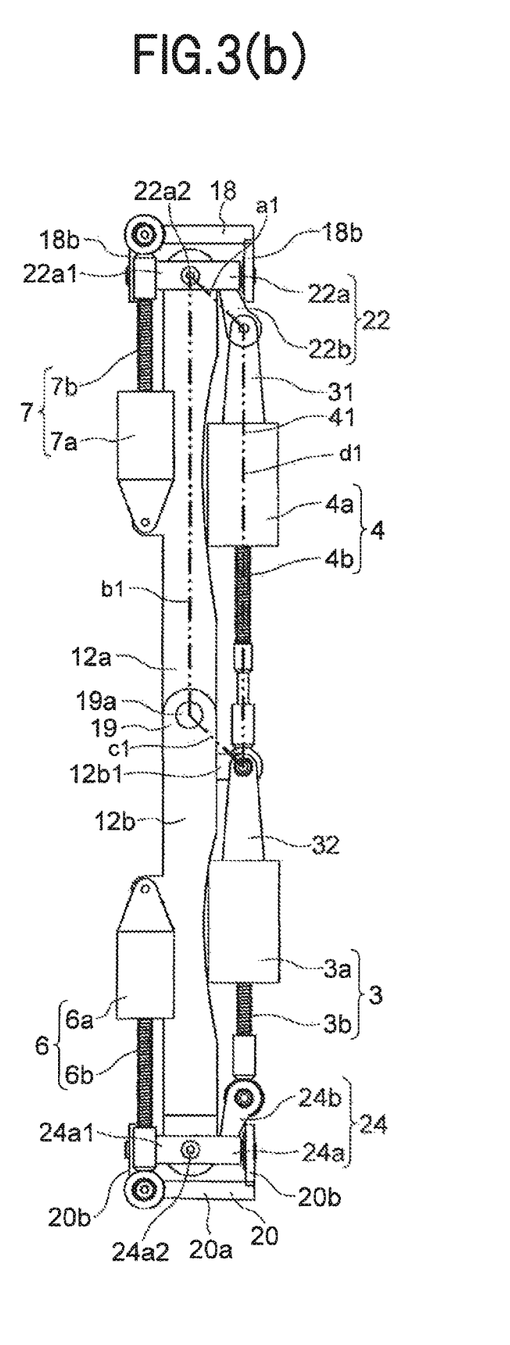

Next, by using FIGS. 2 to 3(b), a structure of each of the leg portions 12 of the legged robot 10 according to the embodiment will be described in detail. FIG. 2 illustrates a perspective view of a stretched leg portion, FIG. 3(a) illustrates a front view of the stretched leg portion, and FIG. 3(b) illustrates a side view of the stretched leg portion.

As shown in FIG. 2, the leg portion 12 includes the hip joint main body 18, the thigh portion 12a, the knee joint main body 19, the lower leg portion 12b, and the ankle joint main body 20. To the hip joint main body 18, the thigh portion 12a is joined with the hip joint coupling 22 interposed therebetween to be rotatable about the roll axis and the pitch axis. To the thigh portion 12a, the knee joint main body 19 is joined to be rotatable about the pitch axis. To the knee joint main body 19, the lower leg portion 12b is connected. To the lower leg portion 12b, the ankle joint main body 20 is joined with the ankle joint coupling 24 interposed therebetween to be rotatable about the roll axis and the pitch axis. Behind the thigh portion 12a, a thigh portion auxiliary link 31 is provided. Behind the lower leg portion 12b, a lower leg portion auxiliary link 32 is provided. Provided as actuators are two hip joint actuators 7 provided in front of the thigh portion 12a, a knee joint actuator 4 provided behind the thigh portion 12a, two ankle joint actuators 6 provided in front of the lower leg portion 12b, and an ankle joint actuator 3 provided behind the lower leg portion 12b.

The hip joint main body 18 is formed by bending a plate and includes a square connecting portion 18a connected to the trunk portion 11 and a pair of coupling joining portions 18b bent from a pair of opposite sides of the connecting portion 18a.

To the hip joint main body 18, the thigh portion 12a is joined with a passive hip joint coupling 22 interposed therebetween to be rotatable about the roll axis and the pitch axis. As shown in FIG. 3(b), the hip joint coupling 22 has a cross-shaped main body portion 22a formed from a roll shaft 22a1 and a pitch shaft 22a2 orthogonal to each other. The roll shaft 22a1 of the main body portion 22a is rotatably joined to the pair of coupling joining portions 18b of the hip joint main body 18 with bearings interposed therebetween. The pitch shaft 22a2 of the main body portion 22a is rotatably joined to the thigh portion 12a with bearings interposed therebetween.

An arm 22b is connected to the main body portion 22a of the hip joint coupling 22. To the arm 22b, an upper end portion of the thigh portion auxiliary link 31 is joined to be rotatable about the pitch axis. A lower end portion of the thigh portion auxiliary link 31 is joined to a bracket 12b1 of the lower leg portion 12b to be rotatable about the pitch axis.

The thigh portion auxiliary link 31 is provided with the knee joint actuator 4 for increasing and decreasing a length between the upper end portion and the lower end portion of the thigh portion auxiliary link 31. The knee joint actuator 4 includes a cylindrical main body portion 4a and a shaft portion 4b that moves linearly in an axial direction relative to the main body portion 4a. A spiral thread groove is formed in an outer peripheral surface of the shaft portion 4b. A ball screw nut (not shown) to be spirally engaged with the thread groove of the shaft portion 4b and a motor (not shown) for driving the ball screw nut for rotation are housed in the main body portion 4a. When the motor drives the ball screw nut for rotation, the shaft portion 4b moves linearly in the axial direction to extend and contract the thigh portion auxiliary link 31.

Supported between the thigh portion 12a and the hip joint main body 18 are the pair of left and right hip joint actuators 7. The hip joint actuators 7 are disposed in front of the thigh portion 12a, and the hip joint actuators 7 and the knee joint actuator 4 are disposed astride the thigh portion 12a. Each of the hip joint actuators 7 includes a cylindrical main body portion 7a and a shaft portion 7b that moves linearly in an axial direction relative to the main body portion 7a. A spiral thread groove is formed in an outer peripheral surface of the shaft portion 7b. A ball screw nut (not shown) to be spirally engaged with the thread groove of the shaft portion 7b and a motor (not shown) for driving the ball screw nut for rotation are housed in the main body portion 7a. When the motor drives the ball screw nut for rotation, the shaft portion 7b moves linearly in the axial direction.

The shaft portion 7b of the hip joint actuator 7 is rotatably joined to the hip joint main body 18 with a spherical bearing interposed therebetween. The main body portion 7a of the hip joint actuator 7 is rotatably joined to the thigh portion 12a with a spherical bearing interposed therebetween. When the two hip joint actuators 7 are simultaneously extended or contracted, the thigh portion 12a rotates about the pitch shaft 22a2 relative to the hip joint main body 18. On the other hand, when one of the two hip joint actuators 7 is extended while the other is contracted, the thigh portion 12a rotates about the roll shaft 22a1 relative to the hip joint main body 18. By controlling rotation angles of the two hip joint actuators 7, it is possible to rotate the thigh portion 12a about the pitch shaft 22a2 and the roll shaft 22a1 relative to the hip joint main body 18.

By providing the passive hip joint coupling 22 having two degrees of freedom between the hip joint main body 18 and the thigh portion 12a, and supporting the two hip joint actuators 7 between the hip joint main body 18 and the thigh portion 12a as in the embodiment, it is possible to generate a several-fold force compared with that in a case in which two motors functioning as positive joints are provided to a pitch shaft and a roll shaft of a hip joint main body 18. Because the hip joint actuators 7 for obtaining a required force can be reduced in size, it is possible to reduce the size of the leg portions 12.

To cause the legged robot to walk on two legs, torque is required to rotate the leg portions 12 about the roll axis relative to the hip joint main body 18 and speed is required to rotate the leg portions 12 about the pitch axis relative to the hip joint main body 18. By supporting the two hip joint actuators 7 between the hip joint main body 18 and the thigh portion 12a, it becomes easy to satisfy the two requirements, i.e., the torque about the roll axis and the speed about the pith axis.

To a lower end portion of the thigh portion 12a, the knee joint main body 19 is mounted to be rotatable about a pitch shaft 19a. In the embodiment, the lower leg portion 12b is integrally formed with the knee joint main body 19.

To the lower leg portion 12b, the ankle joint main body 20 is joined with the ankle joint coupling 24 interposed therebetween to be rotatable about the roll axis and the pitch axis. The ankle joint main body 20 is formed by bending a plate, and has a square connecting portion 20a (see FIG. 2) to be connected to the foot portion 21 (see FIG. 1(a)) and a pair of coupling joining portions 20b bent from a pair of opposite sides of the connecting portion 20a.

The ankle joint coupling 24 has a cross-shaped main body portion 24a formed from a roll shaft 24a1 and a pitch shaft 24a2 orthogonal to each other. The roll shaft 24a1 of the main body portion 24a is rotatably joined to the pair of coupling joining portions 20b of the ankle joint main body 20 with bearings interposed therebetween. The pitch shaft 24a2 of the main body portion 24a is rotatably joined to the lower leg portion 12b with bearings interposed therebetween.

To the main body portion 24a of the ankle joint coupling 24, an arm 24b is connected. To the arm 24b, a lower end portion of the lower leg portion auxiliary link 32 is joined to be rotatable about the pitch axis. An upper end portion of the lower leg portion auxiliary link 32 is joined to the bracket 12b1 of the lower leg portion 12b to be rotatable about the pitch axis.

The lower leg portion auxiliary link 32 is provided with the ankle joint actuator 3 for increasing and decreasing a length between the upper end portion and the lower end portion of the lower leg portion auxiliary link 32. The ankle joint actuator 3 has a cylindrical main body portion 3a and a shaft portion 3b that moves linearly in an axial direction relative to the main body portion 3a. A spiral thread groove is formed in an outer peripheral surface of the shaft portion 3b. A ball screw nut (not shown) to be spirally engaged with the thread groove of the shaft portion 3b and a motor (not shown) for driving the ball screw nut for rotation are housed in the main body portion 3a. When the motor drives the ball screw nut for rotation, the shaft portion 3b moves linearly in the axial direction. When the ankle joint actuator 3 is extended and contracted, the ankle joint main body 20 rotates about the pitch axis.

Supported between the lower leg portion 12b and the ankle joint main body 20 are the pair of left and right ankle joint actuators 6. The ankle joint actuators 6 are disposed in front of the lower leg portion 12b, and the ankle joint actuators 6 and the ankle joint actuator 3 are disposed astride the lower leg portion 12b. Each of the ankle joint actuators 6 includes a cylindrical main body portion 6a and a shaft portion 6b that moves linearly in an axial direction relative to the main body portion 6a. A spiral thread groove is formed in an outer peripheral surface of the shaft portion 6b. A ball screw nut (not shown) to be spirally engaged with the thread groove of the shaft portion 6b and a motor (not shown) for driving the ball screw nut for rotation are housed in the main body portion. When the motor drives the ball screw nut for rotation, the shaft portion 6b moves linearly in the axial direction.

The shaft portion 6b of the ankle joint actuator 6 is rotatably joined to the ankle joint main body 20 with a spherical bearing interposed therebetween. The main body portion 6a of the ankle joint actuator 6 is rotatably joined to the lower leg portion 12b with a spherical bearing interposed therebetween. When the two ankle joint actuators 6 are simultaneously extended or contracted, the ankle joint main body 20 rotates about the pitch shaft 24a2 relative to the lower leg portion 12b. On the other hand, when one of the two ankle joint actuators 6 is extended while the other is contracted, the ankle joint main body 20 rotates about the roll shaft 24a1 relative to the lower leg portion 12b. By controlling rotation angles of the two ankle joint actuators 6, it is possible to rotate the ankle joint main body 20 about the roll shaft 24a1 and the pitch shaft 24a2 relative to the lower leg portion 12b.

The motors of the hip joint actuators 7, the knee joint actuator 4, and the ankle joint actuators 3 and 6 are controlled by drivers. Each of the drivers includes a power inverter such as a PWM (pulse width modulation) inverter for supplying electric power to the motor, a sensor for detecting a speed and a position of an output shaft of the motor, and a controller for controlling the power inverter based on commands from the operation manipulator and information from the sensor. The drivers communicate with each other and can move synchronously without a control box.

Next, a parallel link 41 integrated into the thigh portion 12a, and extending and contracting operations of the thigh portion auxiliary link 31 forming the parallel link 41 will be described. As shown in FIG. 3(b), the parallel link 41 is formed by four links a1, b1, c1, and d1 forming a parallelogram. Opposed links have equal lengths to have relationships of a1=c1 and b1=d1. The link a1 is formed by the arm 22b of the hip joint coupling 22, the link c1 is formed by the knee joint main body 19 (the knee joint main body 19 and the lower leg portion 12b), the link b1 is formed by the thigh portion 12a, and the link d1 is formed by the thigh portion auxiliary link 31.

Figures 4A, 4B:
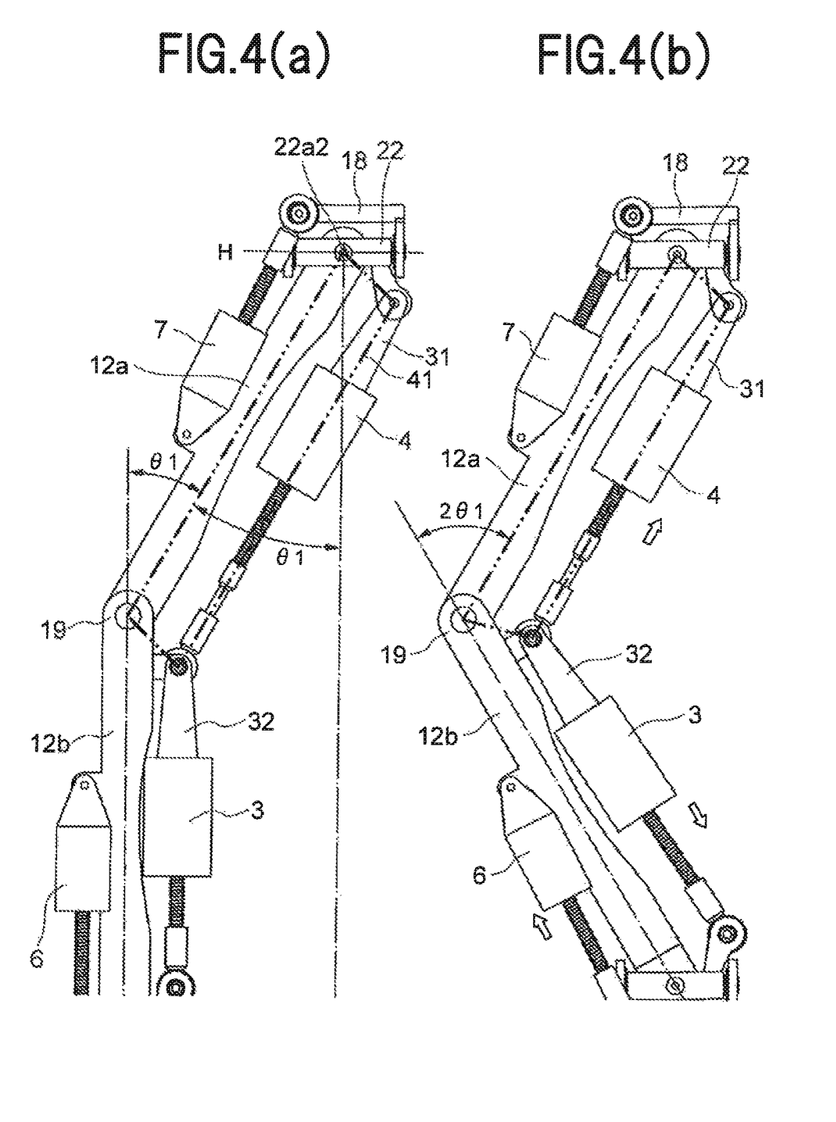
FIGS. 4(a) and 4(b) are movement diagrams for carrying out bending and stretching movements of knee joints of the lower limb structure of the legged robot according to the embodiment (FIG. 4(a) illustrates a state in which a knee joint actuator is not driven and FIG. 4(b) illustrates a state in which the knee joint actuator is driven to bend the knee joint).

FIG. 4(a) shows a state in which the hip joint actuator 7 rotates the thigh portion 12a about the pitch shaft 22a2 to move the thigh portion 12a forward. When the thigh portion 12a is rotated about the pitch shaft, the knee joint main body 19 (the knee joint main body 19 and the lower leg portion 12b) is maintained in a certain attitude relative to the hip joint main body 18 by the action of the parallel link 41. In other words, even when the thigh portion 12a is rotated as shown in FIG. 4(a), the knee joint main body 19 (the knee joint main body 19 and the lower leg portion 12b) is in the vertical attitude in the same way as in FIG. 3(b). As shown in FIG. 4(b), when the knee joint actuator 4 contracts the thigh portion auxiliary link 31, it is possible to change the vertical attitude of the knee joint main body 19 (the knee joint main body 19 and the lower leg portion 12b) so as to bend the knee joint. A human thigh portion has muscles corresponding to the thigh portion auxiliary link 31 at a back portion and it is possible to change an attitude of a knee joint main body by contracting the muscles. By providing the thigh portion auxiliary link 31 behind the thigh portion 12a for extending and contracting the thigh portion auxiliary link 31, it is possible to change the attitude of the knee joint main body 19 using less energy like a human.

Figure 5:
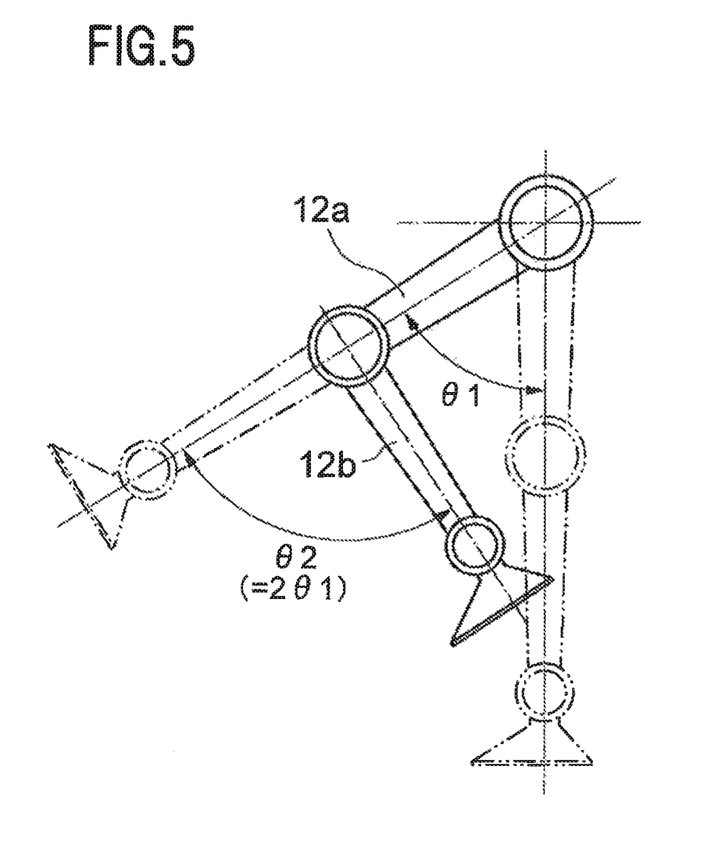
FIG. 5 illustrates a schematic diagram for explaining a load reducing effect of the lower limb structure of the legged robot according to the embodiment on the knee joint actuator.

FIG. 5 is a diagram for explaining a reason why energy for the knee joint actuator 4 can be reduced by extending and contracting the thigh portion auxiliary link 31. First, as a comparative example, an example in which actuators are provided to a hip joint and a knee joint will be described. In the comparative example, assumptions are made that a thigh portion 12a is swung by an angle $\theta 1$ from an upright state of an entire leg portion and that a lower leg portion 12b is bent by $\theta 2$ relative to an axis of a thigh portion 12a at the same time. However, in order to make the comparison with the embodiment easy, assumptions are made that $\theta 2=2\theta 1$, that energy for swinging the thigh portion 12a by $\theta 1$ is E1, that energy required to bend the lower leg portion by $\theta 2$ (=$2\theta 1$) is E2, and that E2=2E1 based on the relationship of $\theta 2=2\theta 1$. Based on these assumptions, the total energy for bringing the leg portion from the upright state into the bent state shown in FIG. 5 (the same bent state as that in FIG. 4(b)) is E1+E2=3E1.

On the other hand, to achieve the same movement in the embodiment, if the length and the mass of the leg portion are the same as those in the comparative example, the energy required for the hip joint actuators 7 to freely move the thigh portion 12a by $\theta 1$ is E1. In swinging of the thigh portion 12a, the lower leg portion bends by an angle $\theta 1$ relative to an axis of the thigh portion 12a by the action of the parallel link as shown in FIG. 4(a). Because the lower leg portion 12b is bent by the angle $\theta 1$ by the action of the parallel link, the angle the knee joint actuator 4 bends the lower leg portion 12b in order to further move the lower leg portion 12b to a position of $2\theta 1$ relative to the axis of the thigh portion 12a as shown in FIG. 4(b) is $\theta 1$ and the energy required to achieve this state is only E1. In other words, the total energy required to complete bending of the leg portion is only 2E1. While the actuator provided to the knee joint in the comparative example is large in order to output 2E1, it is only necessary to provide the knee joint actuator 4 that outputs up to E1 in the embodiment, which reduces the size of the lower limb structure and reduces energy consumption.

Moreover, as shown in FIGS. 4(a) and 4(b), by disposing the lower leg portion auxiliary link 32 behind the lower leg portion 12b, and extending and contracting the lower leg portion auxiliary link 32 with the ankle joint actuator 3, it is possible to change an attitude of the ankle joint main body 20 relative to the lower leg portion 12b. A human lower leg portion has muscles corresponding to the lower leg portion auxiliary link 32 at a back portion and it is possible to change an attitude of the ankle joint main body by contracting the muscles. By providing the lower leg portion auxiliary link 32 behind the lower leg portion 12b, and extending and contracting the lower leg portion auxiliary link 32, it is possible to change the attitude of the ankle joint main body 20 using less energy like a human.

The invention is not limited to the above embodiment but can be changed into various embodiments without departing from the gist of the invention.

Although the hip joint main body and the thigh portion are joined together to be rotatable about the roll axis and the pitch axis in the above embodiment, it is also possible to join a hip joint main body to a thigh portion so that they are rotatable only about a pitch axis. In this case, a thigh portion auxiliary link for forming a parallel link has one end portion joined to the hip joint main body to be rotatable about the pitch axis and the other end portion joined to a knee joint main body to be rotatable about the pitch axis.

Although the linear actuator motors are used as the actuators supported between the hip joint main body and the thigh portion in the above embodiment, it is also possible to use rotary actuators. In this case, each of the rotary actuators may be formed by a motor connected to a thigh portion, a servo horn connected to an output of the motor, and a link having one end portion rotatably joined to the servo horn with a spherical bearing interposed therebetween and the other end portion rotatably joined to a hip joint main body with a spherical bearing interposed therebetween.

Although the lower leg portion are integrally formed with the knee joint main body in the above embodiment, a knee joint main body and a lower leg portion may be joined to be rotatable about a pitch axis.

Although the hip joint main body is connected to the trunk portion in the above embodiment, a hip joint main body and a trunk portion may be formed by an integral frame. Although the ankle joint main body is connected to the foot portion in the above embodiment, an ankle joint main body and a foot portion may be formed by an integral frame.

Although motors are used as the drive sources for swinging the leg portions in the above embodiment, it is possible to use various drive sources such as pneumatic or hydraulic cylinders, linear motors, artificial muscle actuators, and the like as the drive sources besides the motors.

The present description is based on Japanese Patent Application No. 2012-124511 filed on May 31, 2012, all contents of which are incorporated herein.

REFERENCE SIGNS LIST

3 . . . ankle joint actuator, 4 . . . knee joint actuator, 7 . . . hip joint actuators, 10 . . . legged robot, 12 . . . leg portion, 12a . . . thigh portion, 12b . . . lower leg portion, 18 . . . hip joint main body, 19 . . . knee joint main body, 20 . . . ankle joint main body, 22 . . . hip joint coupling, 24 . . . ankle joint coupling, 31 . . . thigh portion auxiliary link, 32 . . . lower leg portion auxiliary link, 41 . . . parallel link

The invention claimed is:

1. A lower limb structure for a legged robot comprising:
a hip joint main body;
a thigh portion;
a hip joint coupling for joining the thigh portion to the hip joint main body so that the thigh portion is rotatable about a first pitch axis and a first roll axis;
a knee joint main body joined to the thigh portion to be rotatable about a second pitch axis;
a thigh portion auxiliary link having one end portion joined to the hip joint coupling to be rotatable about a third pitch axis and another end portion joined to the knee joint main body to be rotatable about a fourth pitch axis; and
a knee joint actuator for increasing and decreasing a length from the one end portion to the another end portion of the thigh portion auxiliary link,
wherein the hip joint coupling, the thigh portion, the knee joint main body and the thigh portion auxiliary link are configured to form a parallel linkage,
wherein, when the thigh portion rotates about the first pitch axis, the knee joint main body is maintained in a certain attitude relative to the hip joint main body by an action of the parallel linkage, and by extending and contracting the thigh portion auxiliary link by means of the knee joint actuator, the certain attitude of the knee joint main body maintained relative to the hip joint main body is changed, and
wherein a hip joint actuator for driving the thigh portion for rotation about the first pitch axis and the first roll axis relative to the hip joint main body is supported between the thigh portion and the hip joint main body.

2. The lower limb structure for the legged robot according to claim 1,
wherein the lower limb structure for the legged robot further comprises
a lower leg portion connected to the knee joint main body,
an ankle joint main body,
an ankle joint coupling for joining the ankle joint main body to the lower leg portion so that the ankle joint main body is rotatable about a fifth pitch axis,
a lower leg portion auxiliary link having one end portion joined to the lower leg portion to be rotatable about the fourth pitch axis and another end portion joined to the ankle joint coupling to be rotatable about a sixth pitch axis, and
an ankle joint actuator for increasing and decreasing a length from the one end portion to the another end portion of the lower leg portion auxiliary link.

3. A legged robot into which the lower limb structure for the legged robot according to claim 2 is incorporated.

4. A legged robot into which the lower limb structure for the legged robot according to claim 1 is incorporated.

* * * * *